US009043113B2

(12) United States Patent
Padilla et al.

(10) Patent No.: US 9,043,113 B2
(45) Date of Patent: May 26, 2015

(54) DRIVE SYSTEM HAVING ONGOING PULL-SLIP LEARNING

(75) Inventors: Christopher A. Padilla, Chillicothe, IL (US); Steven R. Krause, Chillicothe, IL (US); Ted E. Kingham, Germantown Hills, IL (US); Kendall W. Stevens, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 257 days.

(21) Appl. No.: 13/485,073

(22) Filed: May 31, 2012

(65) Prior Publication Data

US 2013/0325266 A1  Dec. 5, 2013

(51) Int. Cl.
*G06F 17/00* (2006.01)
*B60W 40/064* (2012.01)
*E02F 9/26* (2006.01)
*E02F 9/20* (2006.01)
*B60W 40/076* (2012.01)
*B60W 40/105* (2012.01)
*B60L 3/10* (2006.01)

(52) U.S. Cl.
CPC ............. *G06F 17/00* (2013.01); *B60W 40/064* (2013.01); *E02F 9/268* (2013.01); *E02F 9/2079* (2013.01); *B60W 2520/30* (2013.01); *B60W 40/076* (2013.01); *B60W 40/105* (2013.01); *B60W 2720/26* (2013.01); *B60W 2720/30* (2013.01); *B60L 3/106* (2013.01)

(58) Field of Classification Search
CPC ........ G06F 17/00; E02F 9/268; E02F 9/2079; E02F 3/842; B60T 2250/04; B60T 8/172; B60T 8/175; B60W 2520/26; B60W 2520/28; B60W 2520/30; B60W 40/076; B60W 40/064; B60W 40/105; B60W 2720/26; B60W 2720/28; B60W 2720/30; B60L 3/10; B60L 3/106
USPC .......... 701/1, 50, 70, 82, 84, 87, 90; 172/2, 3; 703/2, 8
See application file for complete search history.

(56) References Cited

U.S. PATENT DOCUMENTS

| 38,858 A | | 6/1863 | Connell | |
|---|---|---|---|---|
| 4,322,798 A | * | 3/1982 | McCoin | 701/51 |
| 4,873,638 A | * | 10/1989 | Shiraishi et al. | 701/70 |
| 4,989,686 A | * | 2/1991 | Miller et al. | 180/197 |
| 5,119,299 A | | 6/1992 | Tamura et al. | |
| 5,219,411 A | | 6/1993 | Yamamoto et al. | |
| 5,287,280 A | | 2/1994 | Yamamoto et al. | |
| 5,672,132 A | * | 9/1997 | Schwab | 474/8 |
| 5,765,657 A | * | 6/1998 | Fukumura et al. | 180/197 |
| 5,806,010 A | | 9/1998 | Sawada | |
| 5,819,190 A | | 10/1998 | Nakagami et al. | |
| 5,980,000 A | * | 11/1999 | Kolbe et al. | 303/139 |

(Continued)

*Primary Examiner* — Russell Frejd
(74) *Attorney, Agent, or Firm* — Finnegan, Henderson, Farabow, Garrett & Dunner LLP

(57) ABSTRACT

A drive system for a mobile machine is disclosed. The drive system may have a travel speed sensor, at least one traction device speed sensor, and a controller in communication with the travel speed sensor and the at least one traction device speed sensor. The controller may be configured to determine a slip value associated with a traction device of the mobile machine based on signals generated by the travel speed sensor and the at least one traction device speed sensor, and determine a torque output value of the mobile machine. The control may also be configured to make a comparison of the slip value and the torque output value with a pull-slip curve stored in memory, and selectively update the pull-slip curve based on the comparison.

33 Claims, 3 Drawing Sheets

(56) References Cited

U.S. PATENT DOCUMENTS

| | | |
|---|---|---|
| 6,035,249 A | 3/2000 | Yamamoto et al. |
| 6,298,297 B1 * | 10/2001 | Colby et al. .................... 701/85 |
| 6,450,281 B1 | 9/2002 | Kohler et al. |
| 6,666,279 B2 | 12/2003 | Scarlett et al. |
| RE38,858 E | 11/2005 | Grawey et al. |
| 7,467,830 B2 * | 12/2008 | Donnelly ...................... 303/139 |
| 8,231,183 B2 * | 7/2012 | Joyce ............................ 303/151 |
| 2010/0324766 A1 * | 12/2010 | Linda et al. ..................... 701/22 |

* cited by examiner

DRIVE SYSTEM HAVING ONGOING PULL-SLIP LEARNING

TECHNICAL FIELD

This disclosure relates generally to a drive system and, more particularly, to a drive system having ongoing pull-slip learning.

BACKGROUND

Mobile excavation machines such as dozers, agricultural tractors, and scrapers often include one or more material engaging implements utilized to cultivate, dig, rip or otherwise disturb a ground surface. The ground surface can include non-homogenous loose soil or compacted material that can be easy or difficult for a machine to process. As a machines traverses a site that has changing terrain and/or varying ground surface conditions, the magnitude of resistance applied by the material to the implements and to traction devices of the machine also varies. If not accounted for properly by an operator of the machine, the machine can quickly be overloaded or underloaded. When the machine is overloaded, the traction devices of the machine can be caused to slip (i.e., spin faster than a travel speed of the machine), thereby reducing a forward momentum of the machine and possibly damaging the machine. The loss in momentum can result in lost productivity and/or efficiency. When the machine is underloaded, although the traction devices may not slip, the machine may still lose productivity and efficiency due to a reduced volume of material being moved. In order to help ensure that high productivity and efficiency of the machine are attained without damaging the machine, the operator of the machine must continuously alter settings of the machine and implement to accommodate the changing terrain and ground surface conditions. This continuous altering can be tiring for even a skilled operator and difficult, if not impossible, for a novice operator to achieve optimally.

Traditionally, slip of a mobile machine has been addressed by determining that slip is occurring in one of the traction devices and then manually or autonomously reducing a torque applied to the one or all of the driven traction devices (e.g., by raising or lowering the machine's implement). Although adequate for some situations, this method of reducing slip may still be problematic. In particular, slip must still occur before any action is taken to reduce the slip, thereby still allowing for some loss in productive and efficiency and/or for some damage to occur.

An alternative method of accommodating slip while trying to improve productivity and efficiency is described in U.S. Pat. No. 6,666,279 of Scarlett et al. that issued on Dec. 23, 2003 ("the '279 patent"). In particular, the '279 patent describes a control apparatus that determines an optimal pull-slip curve for use in controlling an associated tractor/implement combination. During a calibration period, the control apparatus records multiple reference values for wheel slip and engine torque corresponding to different depths of an implement pulled by a tractor. The control apparatus then selects one of a series of stored pull-slip curves that most closely approximates the recorded reference values. The selected pull-slip curve is subsequently used in a control algorithm that attempts to reduce slip by limiting engine torque before significant slip occurs.

While the method of the '279 patent may improve machine performance, it may still be less than optimal. Specifically, the calibration process required at startup of the tractor/implement combination, prior to selection of the stored pull-slip curve, may be cumbersome and time-consuming to implement. In addition, because ground conditions can change dramatically within a small work area and/or within a short period of time, the selected curve may not be functional for long. Accordingly, additional calibration processes may be required during a single work shift. Further, the stored pull-slip curves may be theoretically and/or analytically developed and, thus, may not closely match actual performances of individual machines.

The disclosed drive system is directed towards overcoming one or more of the problems as set forth above and/or other problems of the prior art.

SUMMARY

In accordance with one aspect, the present disclosure is directed toward a drive system for a mobile machine. The drive system may include a travel speed sensor, at least one traction device speed sensor, and a controller in communication with the travel speed sensor and the at least one traction device speed sensor. The controller may be configured to determine a slip value associated with a traction device of the mobile machine based on signals generated by the travel speed sensor and the at least one traction device speed sensor, and to determine a torque output value of the mobile machine. The controller may also be configured to make a comparison of the slip value and the torque output value with a pull-slip curve stored in memory, and selectively update the pull-slip curve based on the comparison.

According to another aspect, the present disclosure is directed toward a method of controlling a mobile machine. The method may include determining a slip value associated with a traction device of the mobile machine, and determining a torque output value of the mobile machine. The method may also include making a comparison of the slip value and the torque output value with a pull-slip curve, and selectively updating the pull-slip curve based on the comparison.

DETAILED DESCRIPTION

Figure 1:
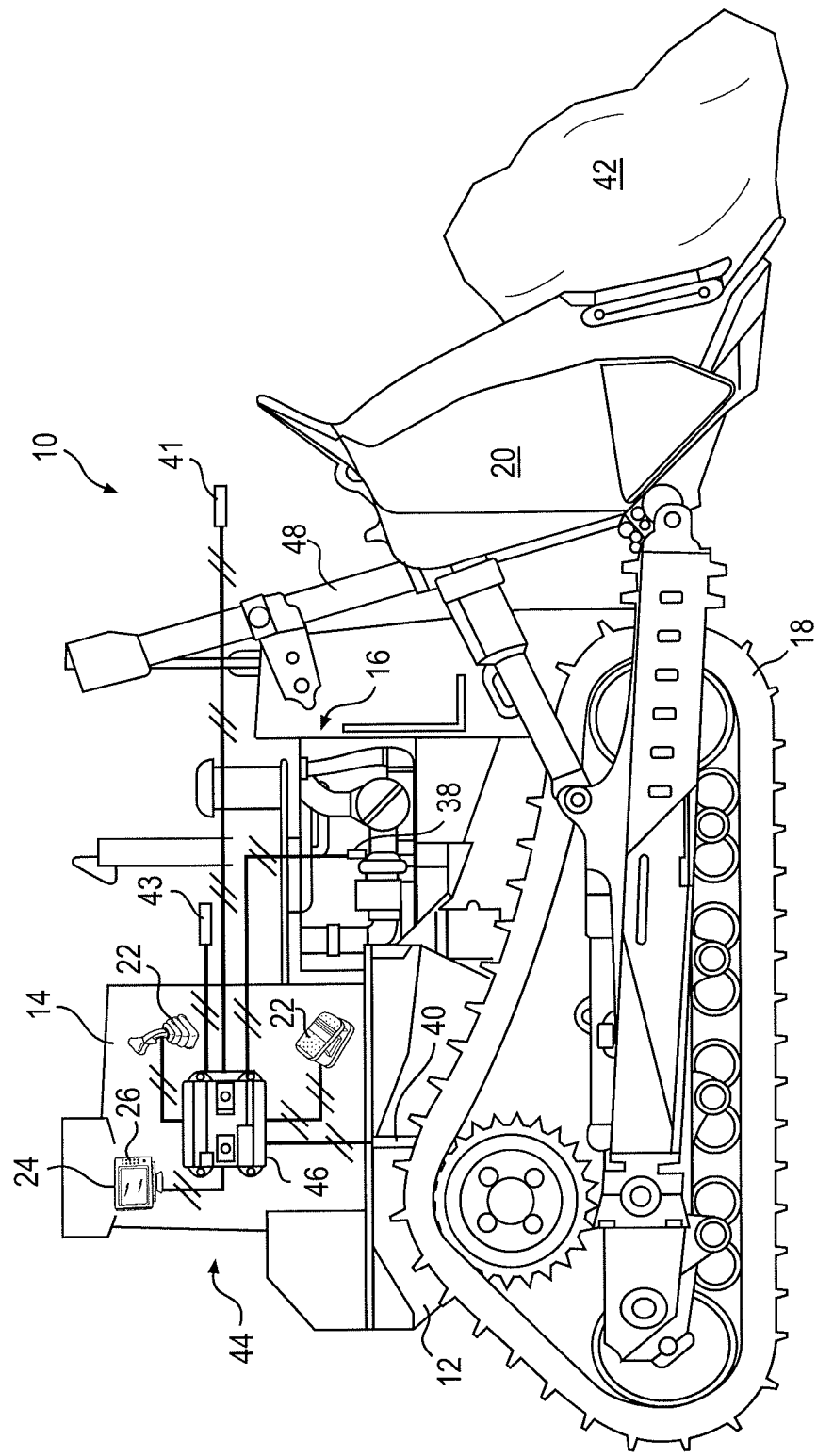
FIG. 1 is a diagrammatic illustration of a mobile machine having an exemplary disclosed drive system.

FIG. 1 illustrates an exemplary machine 10. Machine 10 may be a mobile machine that performs some type of operation associated with an industry such as mining, construction, farming, transportation, or any other industry known in the art. Exemplary operations include, among others, dozing, ripping, scraping, digging, etc. Accordingly, machine 10 may be an earth moving machine such as a dozer (shown in FIG. 1), a scraper, an agricultural tractor, a wheel loader, or another machine known in the art. Machine 10 may generally include a frame 12 that at least partially defines or supports an operator station 14, one or more engines 16 mounted to frame 12, a plurality of traction devices 18 driven by engine 16, and a work tool 20 operatively connected to frame 12 and powered by engine 16.

Operator station 14 may include one or more interface devices 22 located proximate an operator seat (not shown) and configured to generate manual control signals associated with operation of machine 10. As shown in FIG. 1, exemplary interface devices 22 include an accelerator and/or decelerator pedal, and a steering joystick or lever. The pedal may be configured to generate signals indicative of an operator's desire for acceleration or deceleration of machine 10 and/or a corresponding increase or decrease in rotational speed of engine 16. The joystick may be configured to generate signals indicative of an operator's desire for steering of machine 10 that, in the disclosed embodiment, is accomplished through a speed differential between opposing traction devices 18. The same interface devices 22 (e.g., the joystick) or another interface device (not shown) may be associated with work tool 20 and configured to generate additional signals indicative of corresponding movements (e.g., raising, lowering, tilting, and pivoting) desired by the operator. It should be noted that other types of interface devices 22 are also contemplated for use in controlling machine 10.

Operator station 14 may further include a monitor 24 located proximate the operator seat and configured to display information relating to performance of machine 10. Monitor 24 may be any appropriate type of device that provides a graphics user interface (GUI) for presentation of performance information to operators of machine 10. For example, monitor 24 may be a computer console or cab-mounted monitor, an LCD screen, a plasma screen, or another similar device that receives instructions and displays corresponding information. It is contemplated that monitor 24 may also be configured to receive input from the operator regarding desired modes and/or display functionality, for example by way of a touch screen interface 26 or physical buttons and switches, if desired.

Figure 2:
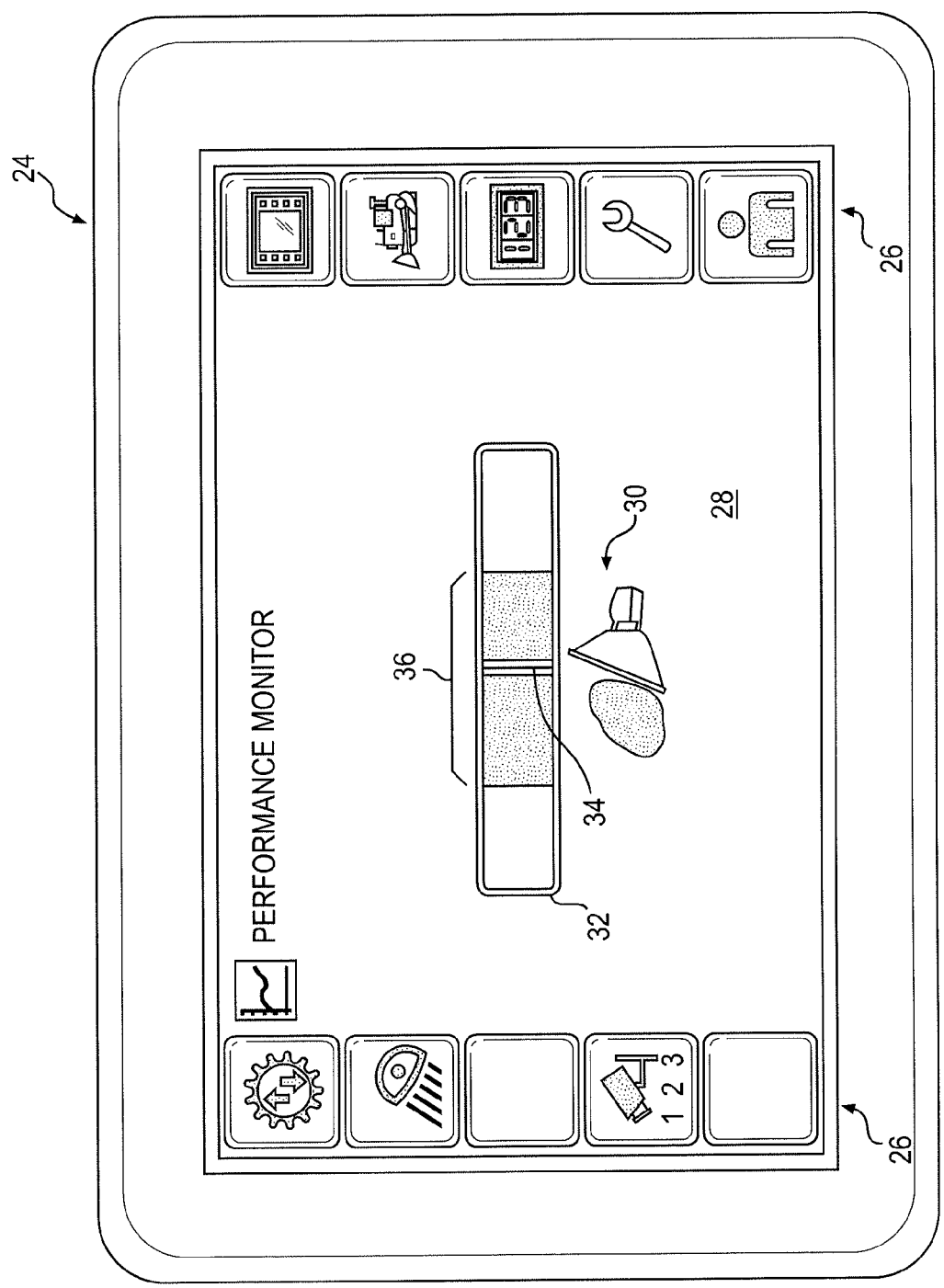
FIG. 2 is a pictorial illustration of an exemplary disclosed monitor that may be used in conjunction with the drive system of FIG. 1.

As shown in the exemplary embodiment of FIG. 2, monitor 24 may include, among other things, a screen area 28 located between vertically oriented touch screen interfaces 26. Screen area 28 may show a representation 30 of work tool 20, for example in a loaded condition, with a performance bar 32 located above representation 30. Performance bar 32 may signify an overall range of machine operation (e.g. a range of output torque transferred to a ground surface 42 by traction devices 18), and include a marker 34 showing current machine performance (i.e., current output torque) within the overall range. A target range 36 may also be shown as a subset within the overall range of operation. In one example, target range 36 may represent a range of torque output values at which traction devices 18 should slip by a desired amount. Target range 36 may be shown in a different color than the overall range of performance, for example in green. In this arrangement, the remaining portion of performance bar 32 may be shown in gray (e.g., for example to the left of target range 36) or red (e.g., to the right of target range 36). Using this display, as will be described in more detail below, the operator of machine 10 may be able to manipulate interface devices 22 to move marker 34 into target range 36 (e.g., by raising or lowering work tool 20 relative to ground surface 42), thereby improving a performance (e.g., productivity and/or efficiency) of machine 10.

Returning to FIG. 1, engine 16 may be an internal combustion engine configured to combust a mixture of fuel and air to produce a mechanical power output. For example, engine 16 may include a diesel engine, a gasoline engine, a gaseous fuel-powered engine, or another type of combustion engine apparent to one skilled in the art. It is contemplated, however, that engine 16 may alternatively embody a non-combustion source of power such as a fuel cell, a battery, or another source known in the art. The power output from engine 16 may be received by a torque converter (not shown) and passed through a transmission (not shown) to drive traction devices 18.

One or more sensors 38 may be associated with engine 16, the torque converter, the transmission, or another drivetrain component to sense an output torque thereof. For example, sensor 38 could be associated with the torque converter to determine a speed ratio of the torque converter. This information, in conjunction with a known or sensed input or output speed of the torque converter (i.e., an output speed of engine 16 or an input speed of the transmission), may be used to determine an amount of torque produced by engine 16 and directed through the transmission to traction devices 18. It is contemplated that the same or another sensor 38 may be used to detect the input and/or output speed, if desired. It is further contemplated that sensor 38 could alternatively be configured to detect fueling of engine 16 (i.e., how much fuel is being combusted by engine 16), the fueling then being used to determine a corresponding torque output value. In a final exemplary configuration, sensor 38 could be a drawbar pull sensor configured to directly detect a torque being exerted by machine 10 on ground surface 42. Other methods known in the art for detecting the torque output of engine 16 that is directed through traction devices 18 and into ground surface 42 may be utilized, if desired.

Traction devices 18 may embody tracks located at opposing sides of machine 10. Each track may be independently driven to turn machine 10 or simultaneously and dependently driven to propel machine 10 in a straight direction. It is contemplated that one or all of traction devices 18 may be replaced with another type of traction device, if desired, such as belts or wheels.

One or more sensors 40 may be associated with traction devices 18 to detect a speed of traction devices 18. In the disclosed embodiment, sensor 40 may be a single speed sensor configured to detect an output speed of the transmission of machine 10 and generate a signal indicative of a speed of traction devices 18. In this arrangement, traction devices 18 could be rotating at different speeds, and the signal generated by sensor 40 would be indicative of an average speed of all driven traction devices 18. It is contemplated, however, that one sensor 40 may be associated with each driven traction device 18 and configured to generate corresponding and independent speed signals, if desired.

Additional sensors may be associated with machine 10 to detect various other performance parameters of machine 10. For example, a travel speed sensor 41 may be operatively connected to frame 12 and embody a Doppler, radar, laser, or GPS type sensor configured to generate signals indicative of the travel speed of machine 10 in manners known in the art. A grade sensor 43 may also be connected to frame 12 and configured to generate signals indicative of a pitch of machine 10, the pitch of machine 10 corresponding to a grade of ground surface 42. Machine 10 may be equipped with additional and/or different sensors, if desired.

Work tool 20 may be supported by frame 12, powered by engine 16, and controllable via interface devices 22. Work tool 20 may include any device used to perform a particular task such as, for example, a blade, a bucket, a fork arrangement, a shovel, or any other task-performing device known in the art. Although connected in the embodiment of FIG. 1 to lift, pivot, and tilt relative to machine 10, work tool 20 may alternatively or additionally rotate, slide, extend, or move in another manner known in the art.

As work tool 20 engages ground surface 42, a load on machine 10 may increase. That is, a torque output passing through traction devices 18 and into ground surface 42 may increase and be passed back through the transmission and the torque converter to engine 16. When this load becomes excessive (and/or a tractive coefficient of ground surface 42 is reduced), one or both of traction devices 18 may begin to slip. For the purposes of this disclosure, slip can be defined as a functional difference between a rotational speed of traction devices 18 (as detected by sensor 40) and a travel speed of machine 10 (as detected by sensor 41). As the rotational speed of traction devices 18 increases beyond the travel speed of machine 10, the value of slip likewise increases. The value of slip can be measured as a percent of the travel speed of machine 10. For example, for a given travel speed of 2 km/hr and a rotational track speed of 2.2 km/hr, the slip value could be calculated as about 10%. Excessive slip can result in lost productivity and efficiency, as well as increased wear on machine 10.

Machine 10 may be equipped with a drive system 44 that is configured to monitor, track, display, and, in some applications, even autonomously control slip of traction devices 18. Drive system 44 may include, among other things, interface devices 22, monitor 24, sensors 38-43, and a controller 46. Controller 46 may be in communication with interface devices 22, monitor 24, and sensors 38-43. In some embodiments, controller 46 may also be in communication with engine 16, with other components of the drivetrain of machine 10 (e.g., the torque converter, the transmission, final drives, etc.), and with actuators 48 used to move work tool 20. Controller 46 may be in communication with each of these components via digital, analog, or mixed types of communication lines, and configured to regulate operation of these components in response to various input.

Controller 46 may embody a single or multiple microprocessors, field programmable gate arrays (FPGAs), digital signal processors (DSPs), etc., that are capable of controlling an operation of drive system 44 in response to the input. Numerous commercially available microprocessors can be configured to perform the functions of controller 46. It should be appreciated that controller 46 could readily embody a microprocessor separate from that controlling other machine functions, or that controller 46 could be integral with a general machine microprocessor and be capable of controlling numerous machine functions and modes of operation. If separate from the general machine microprocessor, controller 46 may communicate with the general machine microprocessor via datalinks or other methods. Various other known circuits may be associated with controller 46, including power supply circuitry, signal-conditioning circuitry, actuator driver circuitry (i.e., circuitry powering solenoids, motors, or piezo actuators), and communication circuitry.

One or more maps relating torque output values of machine 10 to corresponding slip values of traction devices 18 may be stored in the memory of controller 46. Each of these maps may be in the form of tables, graphical curves, and/or equations. Controller 46 may be configured to make a comparison of a current torque output value of machine 10 with these maps to determine an expected amount of slip at that torque output value and/or an amount of permitted deviation from the current torque output value before excessive slip has historically been experienced. Similarly, controller 46 may be configured to make a comparison of a slip value of traction devices 18 with these maps to determine an expected torque output value at that slip value and/or an amount of slip deviation from the current slip value before a particular (e.g., maximum) load has historically been experienced. Controller 46 may provide graphical representations of the maps and/or results of the comparisons to monitor 24 for viewing by the operator. For example, controller 46 may cause performance bar 32, marker 34, and target range 36 to be shown on monitor 24. As described above, a size (e.g., length) of performance bar 32 may correspond with a range of torque output values possible for machine 10. Marker 34 may correspond with a current torque output value within the range. Target range 36 may correspond with a range of torque output values that should result in a desired amount of slip, productivity, and/or efficiency of machine 10. In the disclosed embodiment, target range 36 may be positioned at a location within performance bar 32 and have a size (e.g., a length) corresponding with historical output torque values that resulted in about 2-5% slip.

Figure 3:
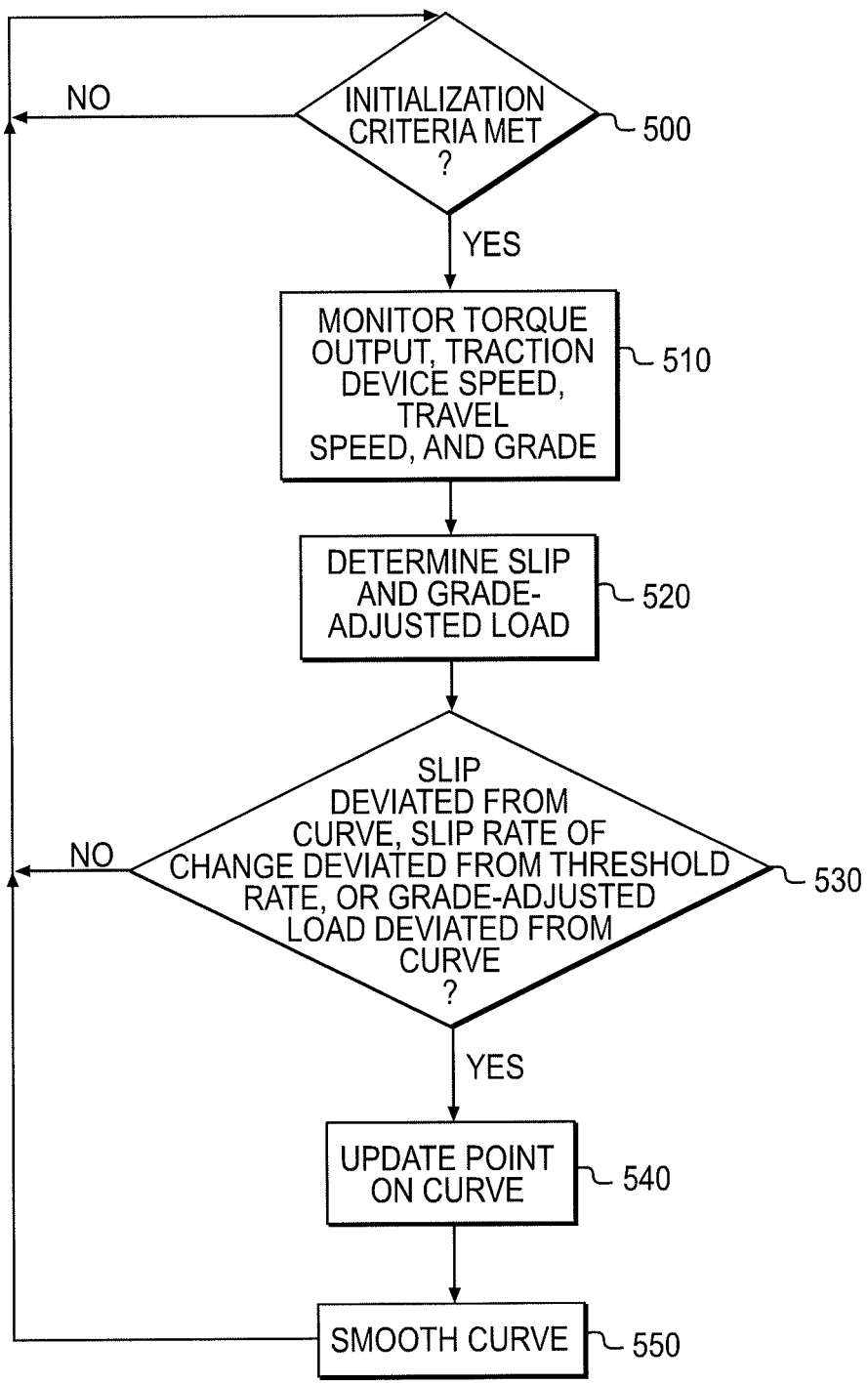
FIG. 3 is a flowchart depicting an exemplary disclosed method of operating the mobile machine of FIG. 1.

In order to be accurate in the location and size of target range 36 within performance bar 32, the maps (e.g., the graphical curve in the maps) relating output torque values to slip values must be accurate. Controller 46 may be configured to continuously monitor the accuracy of the maps and selectively update the graphical curves when actual machine performance deviates unacceptably from expected performance. An exemplary calibration method performed by controller 46 during operation of machine 10 is depicted in FIG. 3. FIG. 3 will be discussed in more detail below to further illustrate the disclosed concepts.

Industrial Applicability

The disclosed drive system finds potential application in any mobile machine where it is desirable to control slip while protecting components of the drive system. The disclosed system may improve slip control in some situations by selectively updating pull-slip curves stored in memory during machine operation, when actual performance deviates from expected performance. The updated pull-slip curves may then be manually and/or autonomously used to control machine operations, thereby improving productivity and efficiency of the machine. Operation of drive system 44 will now be described.

During operation of machine 10, the process of updating the pull-slip curves in the maps of controller 46 may be initiated after it is determined that particular criteria are met (Step 500). Specifically, controller 46 may first be required to determine that machine 10 has been traveling in a straight forward direction (i.e., that a ground speed of machine 10 has been greater than zero in the forward direction and that the operator is not attempting to steer machine 10 via interface device 22) for at least a threshold amount of time (e.g., at least 2 sec.). In some embodiments, controller 46 may also be required to determine that the operator is not manipulating a deceleration pedal. Other initialization criteria may also be utilized, if desired. Until the initialization criteria are met, control may cycle through step 500.

After controller 46 determines that the initialization criteria have been met (Step 500: YES), controller 46 may then monitor torque output, traction device speed, travel speed, and pitch (i.e., ground surface grade) of machine 10 (Step 510). As described above, the torque output of machine 10 may be monitored by way of sensor 38. The traction device speed may be monitored by way of sensor 40. The travel speed of machine 10 may be monitored by way of sensor 41. The grade of ground surface 42 may be monitored by way of sensor 43.

Based on the values of signals from sensors 38-43, controller 46 may be configured to determine the current slip value of machine 10 and the grade-adjusted load on machine 10 corresponding to the current slip value (Step 520). The slip value may be a percent that is determined as a functional difference between the travel speed and the traction device speed (e.g., % slip=100×(Travel Speed−Traction device Speed)/Travel Speed). The grade-adjusted load on machine 10 may be determined by calculating a load on machine 10 and adjusting the load to account for the influence of gravity on the torque output of traction devices 18. That is, when pushing material on a flat surface, machine 10 may be able to push X amount of material (as measured by sensor 38) without slipping. But when pushing material downhill, machine 10 may be able to push X+Y amount of material due to gravity without slipping significantly. Likewise, machine 10 may be able to push only X−Y amount of material when pushing uphill without slipping significantly. Accordingly, the grade-adjusted load may be determined by reducing or increasing the torque output value measured via sensor 38 by an amount associated with the pitch of machine 10.

Controller 46 may then compare the slip value, a change in the slip value, and/or the torque output value (now adjusted for grade) to different thresholds to determine if the pull-slip curves stored in the maps of controller 46 require updating (Step 530). For example, controller 46 may determine if the slip value has deviated from (i.e., is above or below) an expected slip value for the given torque output value by at least a threshold amount. In this example, the threshold amount may be about 5-15%. In another example, controller 46 may determine if the slip value rate of change is greater than a threshold rate. In this example, the threshold rate may be about 5%/sec. In yet another example, controller 46 may determine if the torque output value has deviated from (i.e., is above or below) an expected torque output value for a given slip value. In this example, the threshold amount may be about 5-15%. It is contemplated that controller 46 may use any one or more of these strategies to determine if and when the pull-slip curves stored in memory should be updated, as desired. If at step 530, controller 46 determines that the pull-slip curves do not need to be updated, control may return to step 500.

When controller 46 determines that the pull-slip curve should be updated, controller 46 may adjust a point in the curve corresponding with the current torque output value such that it is linked to the more accurate current slip value (Step 540). In the situation where the rate of change of slip exceeds the corresponding threshold rate, the current values for torque output and slip may be logged into the curve, even though those values may not exceed the corresponding slip or torque output thresholds.

After updating one or more points in the pull-slip curve, the curve may no longer be a continuous smooth curve, but instead could include significant steps up or down. Because a disjointed curve may not accurately reflect true ground surface and/or machine characteristics, controller 46 may be configured to selectively smooth the pull-slip curve along its length (Step 550). Controller 46 may smooth the pull-slip curve by adjusting the curve such that is passes through the newly updated point and is monotonically continuous. In one embodiment, controller 46 may only smooth the pull-slip curve after a number of points (e.g., three points) in the curve have been updated. This may help to reduce the computing time and effort expended during smoothing of the curve, while also helping to avoid smoothing of the curve based on an anomaly. Following completion of step 560, control may return to step 500.

Throughout operation of machine 10, the ongoing learning of the pull-slip curve performed by controller 46 may allow for increased accuracy of the curve. In turn, a more accurate pull-slip curve may allow for improved accuracy in the size and location of target range 36 and in the location of marker 34, which could result in better manual control over the performance of machine 10. In addition, a more accurate pull-slip curve may allow for improved accuracy in autonomous control (i.e., raising and lowering) of work tool 20, such that the actual performance of machine 10 remains within target range 36.

It will be apparent to those skilled in the art that various modifications and variations can be made to the drive system of the present disclosure. Other embodiments of the drive system will be apparent to those skilled in the art from consideration of the specification and practice of the drive system disclosed herein. It is intended that the specification and examples be considered as exemplary only, with a true scope of the invention being indicated by the following claims and their equivalents.

What is claimed is:

1. A drive system for a mobile machine, comprising:
   a travel speed sensor;
   at least one traction device speed sensor; and
   a controller in communication with the travel speed sensor and the at least one traction device speed sensor, the controller being configured to:
      determine a slip value associated with a traction device of the mobile machine based on signals generated by the travel speed sensor and the at least one traction device speed sensor;
      determine a torque output value of the mobile machine;
      make a comparison of the slip value and the torque output value with a pull-slip curve stored in memory; and
      selectively update the pull-slip curve based on the comparison.

2. The drive system of claim 1, wherein the travel speed sensor is one of a Doppler sensor and a GPS sensor.

3. The drive system of claim 2, wherein the at least one traction device speed sensor is configured to generate a signal indicative of an average speed of multiple driven traction devices of the mobile machine.

4. The drive system of claim 3, wherein the slip value is determined as a functional difference between a travel speed of the mobile machine and the average speed of the multiple driven traction devices.

5. The drive system of claim 1, wherein the torque output value is determined as a function of a torque converter speed ratio and at least one of an input speed and an output speed of a torque converter.

6. The drive system of claim 1, wherein the torque output value is determined as a function of engine fueling.

7. The drive system of claim 1, wherein the controller is configured to update the pull-slip curve only when the determined slip value deviates from a corresponding slip value in the pull-slip curve by at least a threshold amount.

8. The drive system of claim 7, wherein the threshold amount is about 5-15%.

9. The drive system of claim 1, wherein the controller is configured to update the pull-slip curve only when a rate of change of the slip value exceeds a threshold rate.

10. The drive system of claim 9, wherein the controller is configured to update the pull-slip curve with current values for the torque output and slip regardless of magnitudes of the torque output and slip values.

11. The drive system of claim 1, wherein the controller is configured to update the pull-slip curve only when the torque output value deviates from a torque output value in the pull-slip curve by at least a threshold amount.

12. The drive system of claim 11, wherein the threshold amount is about 5-15%.

13. The drive system of claim 1, wherein the controller is further configured to modify the entire pull-slip curve when a threshold number of points in the pull-slip curve have been updated such that the modified pull-slip curve is monotonically continuous and passes through the points.

14. The drive system of claim 13, wherein the threshold number of points is three.

15. The drive system of claim 1, wherein the controller is configured to adjust the torque output value based on a pitch of the mobile machine.

16. The drive system of claim 1, wherein the controller is configured to update the pull-slip curve after the mobile machine has been traveling in a straight forward direction for a least a threshold amount of time.

17. The drive system of claim 1, further including a monitor located within the mobile machine, wherein the controller is configured to display on the monitor a representation of current mobile machine performance relative to the pull-slip curve and a target range of performance.

18. The drive system of claim 1, wherein the controller is further configured to autonomously control an operation of the mobile machine based on current machine performance relative to the pull-slip curve.

19. A method for determining a pull-slip curve, comprising:
determining a slip value associated with a traction device of a mobile machine based on signals generated by a travel speed sensor and at least one traction device speed sensor;
determining a torque output value of the mobile machine;
making a comparison, by one or more processors, of the slip value and the torque output value with a pull-slip curve; and
selectively updating the pull-slip curve based on the comparison.

20. The method of claim 19, wherein determining the slip value includes determining the slip value as a function of an average speed of multiple driven traction devices of the mobile machine and a travel speed of the mobile machine.

21. The method of claim 19, wherein determining the torque output value includes determining the torque output value as a function of a torque converter speed ratio and at least one of a torque converter input speed and output speed.

22. The method of claim 19, wherein determining the torque output value includes determining the torque output value as a function of engine fueling.

23. The method of claim 19, wherein selectively updating the pull-slip curve includes selectively updating the pull-slip curve only when the determined slip value deviates from a corresponding slip value in the pull-slip curve by at least a threshold amount.

24. The method of claim 19, wherein selectively updating the pull-slip curve includes selectively updating the pull-slip curve only when a rate of change of the slip value exceeds a threshold rate.

25. The method of claim 24, wherein selectively updating the pull-slip curve includes selectively updating the pull-slip curve with current values for the torque output and slip regardless of magnitudes of the torque output and slip values.

26. The method of claim 19, wherein selectively updating the pull-slip curve includes selectively updating the pull-slip curve only when the torque output value deviates from a torque output value in the pull-slip curve by at least a threshold amount.

27. The method of claim 19, further including modifying the entire pull-slip curve when a threshold number of points in the pull-slip curve have been updated such that the modified pull-slip curve is monotonically continuous and passes through the points.

28. The method of claim 19, further including adjusting the torque output value based on a pitch of the mobile machine.

29. The method of claim 19, wherein selectively updating the pull-slip curve includes updating the pull-slip curve only after the mobile machine has been traveling in a straight forward direction for a least a threshold amount of time.

30. The method of claim 19, further including displaying on a monitor within the mobile machine a representation of current mobile machine performance relative to the pull-slip curve and a target range of performance.

31. The method of claim 19, further including autonomously controlling an operation of the mobile machine based on current machine performance relative to the pull-slip curve.

32. A mobile machine, comprising:
a frame;
an operator station mounted to the frame and including a monitor;
an engine mounted to the frame;
a plurality of traction devices driven by the engine to propel the mobile machine;
a tool operatively connected to the frame and configured to engage a ground surface;
a travel sensor configured to detect a travel speed of the mobile machine;
a traction device speed sensor configured to detect an average speed of the plurality of traction devices; and
a controller in communication with the monitor, the travel sensor, and the traction device speed sensor, the controller being configured to:
determine a slip value as a function of the travel speed and the average speed;
determine a torque output value of the mobile machine;
make a comparison of the slip value and the torque output value with a pull-slip curve stored in memory;
selectively update points in the pull-slip curve based on the comparison when at least one of the slip value, a change rate of the slip value, or the torque output value exceeds a corresponding threshold;
modify the entire pull-slip curve when a threshold number of points in the pull-slip curve have been updated such that the modified pull-slip curve is monotonically continuous and passes through the points; and display on the monitor an indication of current slip and torque output values relative to the pull-slip curve and relative to a target range in the pull-slip curve.

33. A drive system for a mobile machine, comprising:
a travel speed sensor;
at least one traction device speed sensor; and
a controller in communication with the travel speed sensor and the at least one traction device speed sensor, the controller being configured to:
determine a slip value associated with a traction device of the mobile machine based on signals generated by the travel speed sensor and the at least one traction device speed sensor;
determine a torque output value of the mobile machine;
adjust the torque output value based on a pitch of the mobile machine;
make a comparison of the slip value and the adjusted torque output value with a pull-slip curve stored in memory; and
selectively update the pull-slip curve based on the comparison.

* * * * *